3,594,357
POLYMERIZATION OF VINYL COMPOUNDS WITH SELECTED BORON-NITROGEN COMPOUNDS
Anestis L. Logothetis, Wilmington, Del., assignor to E. I. du Pont de Nemours and Company, Wilmington, Del.
No Drawing. Continuation-in-part of application Ser. No. 546,615, May 2, 1966. This application June 24, 1968, Ser. No. 739,151
Int. Cl. C08f 1/74, 1/76
U.S. Cl. 260—88.2   25 Claims

ABSTRACT OF THE DISCLOSURE

Described is a process for the homo- and copolymerization of ethylene which employs an initiating system comprising the following two components or the reaction products thereof:

(1) A borane component consisting of one or more of the boranes of the formulas $$B_2H_6$$
$$RBH_2BH_2R$$
$$R_2BHBHR_2$$
$$R'_3B$$
$$R'_3N \cdot BH_3$$
$$R'_2NH \cdot BH_3 \text{ and}$$
$$R''_3P \cdot BH_3$$

wherein

R is an alkyl group of 1–9 carbon atoms, R' is an alkyl group of 1–12 carbon atoms, and R" is an alkyl, aryl or alkaryl group, each of up to 12 carbon atoms; and (2) A stable free radical or free radical precursor component which may be one of nitric oxide
a 1,1-diaryl-2-(polynitrophenyl)hydrazyl
an N-nitrosodiarylamine
a nitrosoarene
a tetraarylhydrazine
a nitroxide
a tertiary alkyl nitrite
a selected nitrite salt
the ammonium salt of N-nitrosophenylhydroxylamine and
a poly (tert-alkyl)phenoxyl

CROSS REFERENCE TO RELATED APPLICATION

This application is a continuation-in-part of my copending application Serial No. 546,615, filed May 2, 1966, and now abandoned.

BACKGROUND OF THE INVENTION

(1) Field of the invention

This invention relates to a process for polymerizing ethylene and mixtures of ethylene with selected comonomers. More specifically, the invention concerns the above-described process in which a novel borane/free radical initiating system is employed.

(2) Description of the prior art

It is well known that the type of catalyst employed in the homo- and copolymerization of ethylene has considerable effect upon the linearity, molecular weight, crystallinity, density, yield, etc. of the polymer produced. For example, high-pressure, free-radical catalyzed polymerizations do not usually produce the high-density, linear polymers that coordination catalysts do except at low temperature and extreme pressure. It is also known that high-pressure polymerization can be catalyzed by certain borane compounds such as boron hydrides, hydrocarbyl boron hydrides, or borane complexes with amines, and that an oxidant such as oxygen or a peroxy compound is usually employed to facilitate the polymerization. In these latter systems, a free radical inhibitor can be used to halt the reaction.

By employing the novel initiating system of this invention in the high-pressure polymerization of ethylene and its copolymers, an unexpected increase in the rate and yield of the reaction is obtained, which does not require the presence of oxygen, as compared with initiators composed of known borane compounds and oxidants.

The following references provide useful background information on the present invention:

(1) U.S. Pat. 2,985,633 to Welch discloses the polymerization and copolymerization of ethylene in the presence of organoborane compounds such as tributylboron and oxygen.

(2) British Pat. 854,348 discloses the polymerization of terminal olefins in the presence of trialkylboron-ammonia adducts and potassium persulfate. The reference states that in certain cases polymerization inhibitors such as phenthiazine can be employed to prevent premature polymerization of chloroprene. The rate of polymerization is either unchanged or lowered by the presence of the inhibitor.

(3) Furukawa et al. Makromolekulare Chemie 31, 129 (1959) discloses the polymerization of vinyl acetate in the presence of triethylboron, hydrogen peroxide and hydroquinone. The hydroquinone retards the rate of polymerization.

(4) U.S. Pat. 3,061,603 to Calfee et al. discloses the polymerization of ethylene in the presence of diborane or a trialkylboron and oxygen at high pressures.

SUMMARY AND DETAILS OF THE INVENTION

The novel initiating system of this invention comprises a borane component and a stable free radical or free radical precursor component or the reaction product or products of said components. These initiator components and various of their reaction products are discussed more fully in the following paragraphs.

The borane component of the initiating system

The borane component of the initiating system, which will arbitrarily be referred to hereafter as the initiator, is one or more of the boranes of the formulas:

(1) $B_2H_6$
(2) $RBH_2BH_2R$
(3) $R_2BHBHR_2$
(4) $R'_3B$
(5) $R'_3N \cdot BH_3$
(6) $R'_2NH \cdot BH_3$ or
(7) $R''_3P \cdot BH_3$ In the foregoing formulas, R represents alkyl of 1 through 9 carbon atoms, preferably lower alkyl. R' can be the same or different and represents alkyl of 1 through 12 carbon atoms; preferably lower alkyl. With particular reference to the compounds of Formula 4, R' is most preferably lower alkyl of at least two carbon atoms. For any one compound the R' groups are preferably the same. R" can be the same or different and represents alkyl, aryl or alkaryl, each of up to 12 carbon atoms. Preferably the R" groups, in any one compound, are the same; and for reasons of availability the preferred R" groups are lower alkyl, phenyl or alkaryl up to 8 carbon atoms. Most preferably, R" will be lower alkyl or phenyl.

The term "lower" used throughout is defined as meaning the group contains 1 through 6 carbon atoms. Examples of borane initiators defined above include:

diborane,
1,2-dimethyldiborane,
1,2-diethyldiborane,
1,2-dipropyldiborane,
1,2-bis(2,2,4-trimethyl-3-pentyl)diborane, 1,1,2,2-tetramethyldiborane,
1,1,2,2-tetraethyldiborane,
1,1,2,2-tetrabutyldiborane,
1,1,2,2-tetranonyldiborane,
triethylamine-borane,
butyldiethylamine-borane,
dimethyldodecylamine-borane,
diethylamine-borane,
di-tert-butylamineborane,
diisopentylamine-borane,
dioctylamine-borane,
trimethylphosphine-borane,
triheptylphosphine-borane,
dibutyl-2,5-xylylphosphine-borane,
diethylnaphthylphosphine-borane,
3-ethylphenyldimethylphosphine-borane,
tri-p-tolylphosphine-borane,
tris(3-methylpentyl)-borane,
isopropyldipropylborane,
tridodecylborane,
dibutyloctylborane, and
isobutyl-tert-butylpentylborane.

Of the classes of borane compounds defined above, the tertiary-amine-boranes of Formula 5 and the tertiary-phosphine-boranes of Formula 7, when used in conjunction with one of the free radical components described below, constitute a preferred group because they are unreactive at ordinary temperatures and can be handled in air. In addition, many of them are commercially available. The most preferred borane is trimethylamine-borane.

The amount of borane compound used in the process is usually between 0.001% and 10% by weight of the total weight of ethylene and any comonomers. Preferably, it is between 0.02% and 2% of this weight.

The stable free radical component

The stable free radical or stable-free-radical precursor, which will arbitarily be referred to as the co-initiator, can be nitric oxide, a 1,1-diaryl-2-polynitrophenylhydrazyl, an N-nitrosodiarylamine, a nitrosoarene, a tetraarylhydrazine, a nitroxide, a tertiary alkyl nitrite, a selected nitrite salt, the ammonium salt of N-nitrosophenylhydroxylamine, or a poly(tert-alkyl)phenoxyl. These components are more fully described in the immediately following paragraphs.

The coinitiator defined by the term "nitric oxide" needs no further explanation. Nitric oxide has the formula (8) NO The 1,1-diaryl-2-(polynitrophenyl)hydrazyl coinitiators are represented by the formula (9) 

where Ar and Ar', which may be the same or different, contain 6 through 12 carbon atoms each and are aryl, lower alkylphenyl, lower alkoxyphenyl, or halophenyl wherein the halogen is of atomic number 9–35, and Aq is a substituted phenyl group which contains at least two and at most three nitro groups in the 2-, 4-, and 6-positions, and which in addition may contain one other substituent selected from —COOM, —SO₃M, halogen of atomic number 9–35, lower alkyl, or lower alkoxy, where M is hydrogen or an alkali metal. Preferably, for reasons of availability, Ar and Ar' are the same, and preferably they are unsubstituted aryl groups, particularly phenyl. Also, because of availability, the preferred value of Aq is picryl, i.e., 2,4,6-trinitrophenyl. A preferred subclass of coinitiators of the triarylhydrazyl type is therefore represented by the formula (9a) 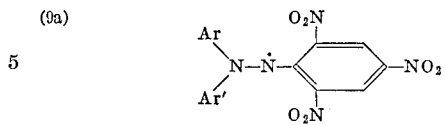

where Ar and Ar' are defined as above.

Representative coinitiators defined in formulas 9 and 9a include 1,1-diphenyl-2-picrylhydrazyl,
1,1-bis(4-biphenylyl)-2-picrylhydrazyl,
1,1-bis(2-naphthyl)-2-picrylhydrazyl,
1-(4-biphenylyl)-1-phenyl-2-picrylhydrazyl,
1-(1-naphthyl)-1-phenyl-2-picrylhydrazyl,
1,1-bis(4-fluorophenyl)-2-picrylhydrazyl,
1,1-bis(4-chlorophenyl)-2-picrylhydrazyl,
1-(4-chlorophenyl)-1-phenyl-2-picrylhydrazyl,
1,1-bis(4-bromophenyl)-2-picrylhydrazyl,
1,1-bis(4-methoxyphenyl)-2-picrylhydrazyl,
1-(4-methoxyphenyl)-1-phenyl-2-picrylhydrazyl,
1-phenyl-1-(p-tolyl)-2-picrylhydrazyl,
1,1-bis(p-tolyl)-2-picrylhydrazyl,
1,1-diphenyl-2-(2,6-dinitrophenyl)hydrazyl,
the sodium salt of 1,1-diphenyl-2-(2,4-dinitro-6-sulfophenyl)hydrazyl,
1,1-diphenyl-2-(2,4-dinitrophenyl)hydrazyl,
the potassium salt of 1,1-diphenyl-2-(2,6-dinitro-4-sulfophenyl)hydrazyl,
1,1-diphenyl-2-(4-bromo-2,6-dinitrophenyl)hydrazyl,
1,1-diphenyl-2-(3-methylpicryl)hydrazyl,
1,1-diphenyl-2-(4-carboxy-2,6-dinitrophenyl)hydrazyl,
1,1-diphenyl-2-(3-chloropicryl)hydrazyl,
and 1,1-diphenyl-2-(3-methoxypicryl)hydrazyl.

N-nitrosodiarylamine coinitiators are represented by the formula

(10) 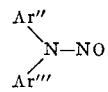

where Ar″ and Ar‴ each contain 6 through 12 carbon atoms, are the same or different, and are aryl, lower alkylaryl, di(lower alkyl)aryl, lower alkoxyaryl, di(lower alkoxy)aryl, haloaryl, dihaloaryl, or alkylhaloaryl in which all halogen is of atomic number 9–35. Preferably, for reasons of availability, Ar″ and Ar‴ are the same, and preferably they are unsubstituted aryl groups.

Examples of coinitiators defined in Formula 10 include

N-nitrosodiphenylamine,
N-nitrosobis(1-naphthyl)amine,
N-nitroso-1-naphthyl(phenyl)amine,
N-nitroso-4-biphenylyl(2-naphthyl)amine,
N-nitrosobis(2-methoxyphenyl)amine,
N-nitroso-3,4-dimethoxyphenyl(phenyl)amine,
N-nitroso-3-sec-butoxyphenyl(phenyl)amine,
N-nitroso-bis(4-fluorophenyl)amine,
N-nitroso-2-chlorophenyl(4-chlorophenyl)amine,
N-nitrosobis(2-bromophenyl)amine,
N-nitroso-bis(3-chlorophenyl)amine,
N-nitroso-2,3-dichlorophenyl(4-chlorophenyl)amine,
N-nitrosobis(2-isopropylphenyl)amine,
N-nitrosobis(3,5-xylyl)amine,
N-nitrosobis(2-bromo-p-tolyl)amine,
N-nitroso-2,4-xylyl(phenyl)amine,
and N-nitrosoditolylamine(o-, m-, or p-).

Nitrosoarene coinitiators are represented by the formula

(11)  U—NO where U is aryl of 6 through 12 carbon atoms, lower alkylphenyl, lower alkoxyphenyl, or halophenyl wherein the halogen is of atomic number 9–35. Examples include nitrosobenzene, nitrosotoluene (o-, m-, or p-), 2 - ethylnitrosobenzene, 4-nitrosobiphenyl, 1-nitrosonaphthalene, bromonitrosobenzene (2-, 3-, or 4-), chloronitrosobenzene (2-, 3-, or 4-), 4-fluoronitrosobenzene, and 2-methoxynitrosobenzene. Preferably, for reasons of availability, U is an unsubstituted aryl group.

Tetraarylhydrazine coinitiators are represented by the formula

(12)  $U_2'N-NU_2''$ where U' and U'' are the same or different and are phenyl or naphthyl. Preferably, they are the same and are phenyl. Examples include tetraphenylhydrazine, tetrakis(1-naphthyl)hydrazine, tetrakis(2-naphthyl)hydrazine, and 1,1-bis(1-naphthyl)-2,2-bis(2-naphthyl)hydrazine.

Nitroxide coinitiators are represented by the formula

(13)  

where Q is tert-alkyl of 4 through 6 carbon atoms or 2,6-di(lower alkoxy)phenyl (preferably 2,6-dimethoxyphenyl) and Q' is the same as Q and in addition can be 2-phenyl-2-propyl or 4-(lower alkoxy)phenyl (preferably 4-methoxyphenyl) when Q is 2,6-di(lower alkoxy)phenyl. Examples are di-tert-butyl nitroxide,
di-tert-amyl nitroxide,
tert-butyl 2,6-dimethoxyphenyl nitroxide,
2,6-dimethoxyphenyl 2-phenyl-2-propyl nitroxide,
bis(2,6-dimethoxyphenyl) nitroxide, and
2,6-dimethoxyphenyl 4-methoxyphenyl nitroxide.

Preferably 3 and Q' are the same and are tert-alkyl.

Operable tert-alkyl nitrite coinitiators include those containing 4 through 8 carbon atoms and are exemplified by tert-butyl nitrite, tert-pentyl nitrite and tert-octyl nitrite.

Operable nitrite salt initiators include those in which the cation is ammonium, an alkali metal, or an alkaline-earth metal and are exemplified by sodium nitrite, cesium nitrite, calcium nitrite, and barium nitrite.

The ammonium salt of N-nitrosophenylhydroxylamine has the formula

Poly(tert-alkyl)phenoxyl initiators are those where the tert-alkyl group contains 4 through 6 carbon atoms. Preferably this initiator is 2,4,6-tris(tert-butyl)phenoxyl.

The most effective of these compounds as coinitiators, and therefore the preferred ones, are nitric oxide, the diarylpicrylhydrazyls, particularly 1,1-diphenyl-2-picrylhydrazyl, and the N-nitrosodiarylamines. Nitric oxide is particularly preferred because it is an inexpensive, industrially available compound.

One skilled in the art will recognize each of the foregoing coinitiators as having an unpaired electron associated with nitrogen or oxygen, or as being a precursor of such a compound.

The amount of coinitiator used in the process is usually between about 0.02 mole to 4 moles per mole of borane compound. Preferably it is from 0.05 mole to 2 moles per mole of borane compound. Most preferably the range is 0.05 mole to 1 mole per mole of borane compound.

Reaction products of borane and free radical components

The exact nature of the novel catalysts effective for the polymerization of olefins by the method of this invention is not known. It is known, however, that stable compounds having an unpaired electron, such as nitric oxide, generally inhibit free radical polymerizations. It is a reasonable supposition, therefore, that some reaction product or products formed from the various initiator and coinitiator combinations of the present invention serves as the actual polymerization catalyst. In some instances the reaction product could be a simple adduct. In the case of the catalyst formed by the reaction of nitric oxide and an alkyl borane or mixture of alkyl boranes, a number of reaction products is known, many of which can be isolated. Such compounds include:

(14)  $R_2'BONR_2'$

(15)  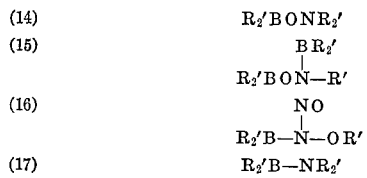

(16)

(17)  $R_2'B-NR_2'$

When water is present in the reaction medium the compound

(18)  $R_2'BONHR'$ is also formed by hydrolysis of

compound (15).

In the above formulas R' has the previously stated significance representing alkyl groups of 1–12 carbon atoms, the preference being for lower alkyl groups of 1–6 carbon atoms. Most preferably R' is lower alkyl of 2–6 carbon atoms in the case of the compounds of Formulas 14–18.

Compounds of Formula 14 can be prepared by the reaction of trialkylboranes with nitric oxide according to the following equation:

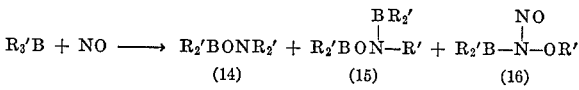

To obtain pure material an excess of nitric oxide is required. The preparation of compound (14) where R'= ethyl is detailed in Example A. This work suggests that the process produces an unstable intermediate which is destroyed by the excess nitric oxide. If not destroyed, this intermediate decomposes between 30 and 60° C. to form compound (17) which azeotropes with compound (14) on attempted distillation.

Two preparations of the tetrabutyl analog of compound (14) are described by Inatome and Kuhn in Boron-Nitrogen Chemistry, Advances in Chemistry, Series No. 42, 183–191, American Chemical Society, Washington, D.C., but no experimental details for the actual isolation and identification of the product are given.

Compound (15) has been isolated only as the product of the reaction between a trialkylborane and nitric oxide as represented in the foregoing equation. The preparation of compound (15) where R'=ethyl is detailed in Example B. Since compounds (15) and (16) form an azeotrope, it is necessary to minimize the formation of the latter to realize substantial yields of the former. The formation of compound (16) can be minimized by carrying out the reaction between nitric oxide and the trialkylborane at low temperatures with an excess of trialkylborane. Inatome and Kuhn have prepared the tetrabutyl analog of compound (15) without isolating it in the pure state.

Compound (16) is formed along with compounds (14) and (15) in the reaction of a trialkylborane with excess nitric oxide. On selective hydrolysis of the product mixture, compound (15) can be converted to compound (18) which crystallizes out of the reaction mixture. This hydrolysis of compound (15) to produce compound (18) constitutes a good preparative procedure for the latter. Distillation of the filtrate from which crystalline compound (18) is recovered yields pure compound (16). As an alternative to this method of preparing compound (16) selective hydrolysis of the mixture of products formed on reaction of a trialkylborane with nitric oxide may be omitted. Compound (15) will not be converted to crystalline compound (18) in such a case. But distillation of the azeotropic mixture of compounds (15) and (16)

beyond the boiling point of the azeotrope yields pure compound (16). Compound (16) can also be prepared by reaction of compound (15) with excess nitric oxide.

The preparation of compounds (16) and (18) where R′=ethyl is detailed in Example C. The tributyl analogs of these compounds were similarly prepared by Inatome and Kuhn. In addition these same workers synthesized the tributyl analog of compound (18) by the reaction of dibutylborinic acid with N-butylhydroxylamine.

Although compounds of Formula 17 can also be prepared by the reaction of a trialkylborane with nitric oxide, these compounds are best synthesized by the reaction of a Grignard reagent with a dichloroaminoborane derivative. The procedure is detailed by K. Niedenzu and J. Dawson in J. Am. Chem. Soc., 81, 5553 (1959). The reaction may be represented schematically as

$$2R'MgX + R_2'BNCl_2 \rightarrow R_2'NBR_2'$$

Examples D–F illustrate the preparation of $Et_2BNEt_2$ and $Et_2BN(CH_3)_2$ by the foregoing method.

Two other methods of preparing type (17) compounds are known. Pyrolysis of a type (14) compound according to the equation

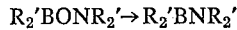
$$R_2'BONR_2' \rightarrow R_2'BNR_2'$$

yields compounds of type (17). Example D illustrates preparation of $Et_2BNEt_2$ by this means. Amine exchange according to the equation

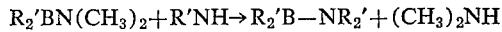
$$R_2'BN(CH_3)_2 + R'NH \rightarrow R_2'B-NR_2' + (CH_3)_2NH$$

likewise leads to compounds of type (17). In Z. Naturforschung, 16B, 470 (1961), H. Nöth describes the preparation of $(CH_3)_2BNEt_2$ and $(CH_3)_2BN(C_4H_9)_2$ in excellent yield by heating $(CH_3)_2BN(CH_3)_2$ with the corresponding secondary amine. The reaction is also operable using primary amines such as aniline, butylamine and ammonia.

All of the initiator compounds of type (14)–(18) are useful in the polymerizations of the present invention. Details of their operability are recited in Examples 1–7.

Monomers

Monomers that can be polymerized with the various initiating systems of this invention include ethylene and monomers which copolymerize with ethylene. The comonomers with ethylene include:

(a) Lower terminal olefins, i.e., monoethylenically unsaturated hydrocarbons containing the $>C=CH_2$ group. Examples are propylene, 1-butene, isobutylene, 1-pentene, tert-butylethylene, and 1-heptene and the like.

(b) Fluorinated olefins of 2–3 carbons, e.g., vinyl fluoride, vinylidene fluoride, tetrafluoroethylene, and hexafluoropropylene.

(c) Vinyl lower alkanecarboxylates, e.g., vinyl acetate and vinyl butyrate.

(d) Lower alkyl methacrylates, e.g., methyl methacrylate, propyl methacrylate, and isopentyl methacrylate.

(e) Styrene and ring-substituted styrenes containing up to 2 substituents selected from lower alkyl, lower alkoxy, or halogen of atomic number 9–35. Examples are styrene, methylsytrene (2-, 3-, or 4-), ethylstyrene (2-, 3-, or 4-), 2,5-dimethylstyrene, 3-tert-butylstyrene, 4-ethoxystyeren, 2,6-dimethoxystyrene, 4-methoxy-3-methylstyrene, chlorostyrene, (2-, 3-, or 4-), 2,5-dichlorostyrene, bromostyrene (2-, 3-, or 4-), and fluorostyrene (2-, 3-, or 4-), and the like.

(f) Dicyclopentadiene and di(methylcyclopentadiene).

The preferred comonomers are terminal lower olefins, particularly, for economic reasons, propylene and isobutylene.

Optionally, in addition to one of the foregoing comonomers, up to about 10 mole percent and preferably up to about 5 mole percent, based on total monomers, of a third monomer can be copolymerized or, more accurately, terpolymerized with ethylene by the process of the invention. Compounds operable as third monomers include any of the foregoing comonomers (it is assumed, of course, that any second and third monomers will be different compounds). Other third monomers are diolefins and cyclodiolefins in which the double bonds are isolated (i.e., compounds in which the double bonds are in other than 1,2- or 1,3-configurations), carbon monoxide, and sulfur dioxide. Examples of operable diolefins are 1,4-hexadiene, 1,5-hexadiene, 5-methylenenorbornene, dicyclopentadiene, di(methylcyclopentadiene), 1,7 - octadiene, 3,7-dimethyl-1,6-octadiene, and 5-(2-butenyl)norbornene.

Up to about 0.5 mole of comonomer or combined comonomers per mole of ethylene can be used.

The process

The process of this invention is carried out by polymerizing the monmer or monomers in contact with the initiating system at a pressure of about 200 atmospheres or higher and a temperature of between about 100° C. and 250° C.

For simplicity of operation, it is preferred to operate in the absence of a diluent unless a moderating effect on the initiating system is desired or a convenient carrier for one or both components of the initiating system is desired. Diluents which can be employed include aromatic hydrocarbons, such as benzene, toluene, xylene, and ethylbenzene; fluorocarbons such as perfluorodimethylcyclobutanes; chlorofluorocarbons, such as 1,1,2-trichlorotrifluoroethane; hydroxylic compounds, such as alkanols (e.g., ethyl alcohol, tert-butyl alcohol, and 2-ethylhexyl alcohol) and water; and ethers, such as tetrahydrofuran, 1,2-dimethoxyethane, ethyl ether, and dioxane. The preferred solvents are aromatic hydrocarbons. If desired, the reaction can be carried out in the presence of a buffer to control the pH of the system.

An upper limit on the pressure is imposed only by the limitations of the equipment. Usually a pressure in the range of about 500–3000 atmospheres is used, and this is the preferred range.

Operable temperatures are between about 100° C. and 250° C., the preferred range being about 100–200° C. The optimum temperature for any particular run will depend on the initiator system, the comonomer (if any), the presence or absence of a diluent and the pressure.

The reaction is conveniently carried out by charging a container with the initiating system under an inert atmosphere, such as nitrogen, evacuating the container and charging it with the monomers, and agitating the reactants, as for example shaking. Pressure can be regulated by pressurizing with gaseous monomer or monomers.

The effects and relationships between process variables such as initiator concentration, diluent, temperature, pressure and time are in general those already known to one skilled in the art of ethylene polymerization.

The rate of polymerization increases with higher temperatures and pressures. However, linear polymers having linearity approaching those prepared by coordination catalyst systems can be obtained by lowering the temperature to the lower range, about 100° C. to 150° C., while employing high pressures.

Reaction time is not critical and can range, in general, from less than an hour to more than five hours.

The compounds comprising the initiating systems of Examples 1–7 may be prepared by the following methods:

(A) Preparation of $Et_2BONEt_2$ ($Et=C_2H_5$).—A 1-liter flask, equipped with a Dry Ice condenser, thermometer, and a magnetic stirrer, was charged with 227 g. of triethylborane, and a 1:1 mixture of dry nitrogen with 95 g. nitric oxide gas was slowly bubbled through the liquid over a period of 64 hours while the flask contents were maintained at 10–12° C. by a water bath. (The excess nitric oxide appears to destroy certain by-products which prevent the isolation of pure $Et_2BONEt_2$.)

The reaction product was vacuum distilled at a pot temperature of 45–48° C. A Dry Ice trap was used to protect the vacuum pump. The first fraction (38 g., B.P.

24°/0.35 mm.) and the trap contents (19.5 g.) were combined and redistilled through an efficient packed column. A center fraction boiling at 28°/3.6 mm. was collected and stored in an amber glass sealed ampoule at −20° C. N.M.R. analysis indicated that the product was $Et_2BONEt_2$ in purity of 85% or better. The product could be further purified by gas chromatography.

(B) Preparation of

In a 2-liter unit similar to the 1-liter unit described in Example (A), a 1:1 mixture of dry nitrogen with 76 g. of nitric oxide was bubbled through 395 g. of triethylborane at 7–10° C. over a period of 27.5 hrs. The unreacted triethylborane was distilled through a glass-packed column. The pot residue (~194 g.) was then fractionally distilled through a glass-packed column. Fractions containing $Et_2BNEt_2$, $Et_2BONEt_2$ and

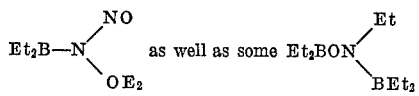

distilled and were rejected. Vapor phase chromatography was used to follow the progress of the distillation.

A 57.4 g. fraction containing 100% pure

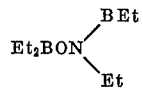

was collected at 24–27°/0.1 mm. the N.M.R. spectrum of the product confirmed the purity of the material.

*Analysis.*—Calcd. for $C_{10}H_{25}B_2ON$ (percent): C, 61.30; H, 12.79; N, 7.11; B, 10.98. Found (percent): C, 60.99; H, 12.44; N, 7.40, 7.29; B, 11.28, 11.25.

The product was stored under dry nitrogen in sealed ampoules at −20° C.

(C) Preparation of

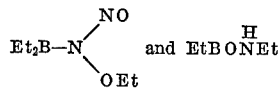

In an apparatus similar to that described in Example (A), 136 g. of triethylborane was treated with a slow stream of nitric oxide gas while the reaction mixture was maintained at 0–10° C. Nitric oxide was passed through this reaction mixture for three hours after absorption ceased.

The reaction mixture was distilled through a 16-inch Helipak column. A fraction boiling at 27–30°/0.2 mm. weighed 80.7 g. and contained 50%

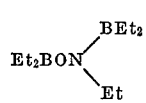

and 45%

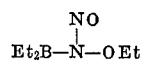

as determined from the N.M.R. spectrum. This distillation was continued, and a fraction weighing 8.0 g. and boiling at 30°/0.05 mm. was next collected. The N.M.R. spectrum indicated this fraction to be pure

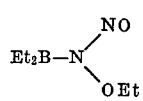

A 73.8 g. portion of the fraction containing 50%

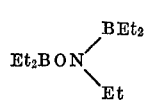

and 45%

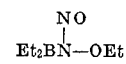

(B.P. 27–30°/0.2 mm.) was stirred with 4 ml. of water for three days, during which time the aqueous layer completely disappeared. Three volumes of hexane were added, and the solution was cooled to −80° C. White crystalline $Et_2BONHEt$ (14 g.) deposited and was separated by filtration. After recrystallization from 1,1,2-trichloro-1,2,2-trifluoroethane (Freon-113®) at −20° C., the crystals recovered weighed 13.5 g. and melted at 47.6–48.4° C.

The filtrate was distilled under reduced pressure and the fractions boiling between 40°/0.7 mm. and 73°/0.05 mm. were collected. The N.M.R. spectra of these fractions were identical and indicated that the product was pure

The combined weight of these fractions was 14.4 g. The infrared spectrum of this product was identical to that of the 8.0 g. fraction of pure

(B.P. 30°/0.05 mm.) described previously.

(D) *Preparation of $Et_2BNEt_2$.*—A solution of 31 g. of dichloro(diethylamino)borane, prepared by the method of Osthoff and Brown described in J. Am. Chem. Soc., 74, 2378 (1952), in 300 ml. of dry benzene was added to a solution of 150 ml. of commercial 3M ethylmagnesium bromide in ether. This solution was diluted with an additional 150 ml. of ether. The resulting mixture was heated to reflux for 2 hours. Most of the ether was then allowed to distill off. The mixture was filtered, and the filtrate was distilled to yield 10.5 g. of diethyl(diethylamino)borane, B.P. 60–62°/37 mm., $n_D^{25}$ 1.4278.

Diethyl(diethylamino)borane $Et_2BNEt_2$, was also prepared by heating 50 g. of a 1:1 mixture of $Et_2BNEt_2$ and $Et_2BONEt_2$ to 150° for 5 hours. A total of 30 g. of $Et_2BNEt_2$ was obtained on distillation, this result suggesting that some of the $Et_2BONEt_2$ was converted to $Et_2BNEt_2$.

(E) *Preparation of $Et_2B$—$N(CH_2)_2$.*—Methylmagnesium iodide was prepared by treatment of 11.7 g. of magnesium turnings in 200 ml. of ether with 75 g. of ethyl iodide (added dropwise) in 100 ml. of dry ether. The resulting solution was stirred and refluxed until all of the magnesium had dissolved. A solution of 30 g. of dichloro(dimethylamino)borane, prepared by the method of Brown described in J. Am. Chem. Soc., 74, 1219 (1952), in 100 ml. of ether was added slowly to the Grignard reagent solution at reflux and heating was continued for 2 hours. After the mixture had stood overnight at room temperature, solvent was distilled. The residue was heated to 100° C., and volatile materials were distilled at 0.01 mm. pressure into a trap cooled by liquid nitrogen. Redistillation of the trap contents yielded 9.69 g. of dimethyl(diethylamino)borane, B.P. 54°/80 mm. The N.M.R. spectrum of the product indicated that it was pure.

(F) *Preparation of $Et_2N$—$B(CH_3)_2$.*—Methylmagnesium iodide was prepared by the addition of 71 g. of methyl iodide in 100 ml. of ether to 12.2 g. of magnesium turnings in 200 ml. of dry ether heated to reflux. When all of the magnesium had dissolved, a solution of 38.2 g. of dichloro(diethylamino)borane in 100 ml. of ether was added slowly. After an additional hour at reflux, the solution was cooled and allowed to stand overnight. The volatile products and solvent were then stripped off under high vacuum and condensed into a trap cooled with liquid nitrogen. The entire product was distilled through a packed column, and 21.66 g. (77%) of dimethyl(diethylamino)borane was collected at 104–105° C.

11

The following examples illustrate in further detail the invention described above, but are not intended to limit the invention in any manner.

EXAMPLE 1

Polymerization with $Et_2BONEt_2$

An 80 ml. shaker tube lined with Hastelloy® C was charged with 4 ml. of benzene and 0.1 g. of O-diethyl-boryl-N-diethylhydroxylamine, $Et_2BONEt_2$, the latter in a sealed, frangible, glass ampoule. The shaker tube was evacuated and pressured to 1300 atm. by addition of 35.4 g. of ethylene and 12.8 g. of propylene at room temperature. The ampoule containing the catalyst broke during this pressuring. Shaking was started and the temperature was raised to 100° C. The temperature was increased at a rate of about 10° C./hour to 150° C. A pressure drop was observed to commence at a temperature of about 136–140°, indicating that copolymerization had started. The tube temperature was maintained at about 150° C. for 10–11 hours, and the pressure was maintained between 1900 and 2500 atmospheres by injection of small additional amounts of ethylene and propylene. The total amount of ethylene and propylene added to the tube was 38.9 g. and 14.1 g. respectively. These amounts are equivalent to 1.77 moles of ethylene and 0.33 moles of propylene representing an ethylene/propylene molar ratio of 5.4:1. The tube was cooled and opened, and the solid product was triturated with methanol and dried under reduced pressure. There was thus obtained 10.2 g. of a solid ethylene/propylene copolymer. The polymer melting temperature, determined by differential thermal analysis, was 80° C. The infrared absorption spectrum indicated that the copolymer contained about 14% by weight of combined propylene. The inherent viscosity was 0.32 (0.25% solution in perchloroethylene at 60° C.).

By essentially the same procedure as that of this example, a number of other ethylene/propylene copolymerizations were carried out with borane derivative initiators. Details of these experiments are summarized in the accompanying Table I. In each run, the copolymerization temperature was determined by exploration, as in Example I. This temperature was that at or near which a significant pressure drop was observed. Also as in Example 1, the ethylene/propylene molar ratio was about 4:1, and the amount of combined comonomer in the product was estimated from the infrared absorption spectrum of the polymer.

12 produced. The ampoule broke as the pressure inside the shaker tube increased. After 10 hours of heating at 140° C., the pressure inside the shaker tube had dropped from 1000 to 600 atmospheres, and a total of 9.5 g. of crude polyethylene was obtained. This polymer was dissolved in xylene and reprecipitated using methanol to give 8.3 g. of polyethylene. The melting point as determined by differential thermal analysis was found to be 112° C. The inherent viscosity was 1.12 and the density was 0.9196. An infrared determination indicated 3.1 methyl groups per hundred carbon atoms.

(B) By essentially the process of Example 7(A), 0.2 ml. of $Et_2BONEt_2$, sealed in a glass ampoule in the absence of air, was processed with ethylene. After ten hours of heating, the pressure in the shaker tube decreased from 1020 to 350 atmospheres. 19.6 g. of crude polyethylene was recovered which gave 18.1 g. of product on precipitation. The polymer had a DTA melting point of 106° C., an inherent viscosity of 01.5 and a density of 0.9096. Infrared analysis indicated 5.5 methyl groups per hundred carbon atoms.

(C) By essentially the process of Example 7(A) 0.2 g. of $Et_2BONHEt$ was processed with ethylene at 140° C., starting at 1060 atmospheres. After 8 hours the pressure within the shaker tube decreased from 1060 to 820 atmospheres. A total of 6.2 g. of crude polyethylene was recovered which after reprecipitation yielded 5.5 g. of product. The polymer had a DTA melting point of 119° C., an inherent viscosity of 0.42 and a density of 0.947. An infrared analysis indicated 2.5 methyl groups per hundred carbon atoms.

EXAMPLE 8

A 400-ml., stainless-steel shaker tube was charged, under an atmosphere of nitrogen, with 0.2 g. of trimethylamineborane and 0.15 g. of 1,1-diphenyl-2-picrylhydrazyl. Shaking was started, and the tube was evacuated and pressured with ethylene so that the internal pressure was 200 atmospheres at 26° C. The tube was heated to 150° C. over a period of 45 minutes, during which time it was intermittently pressured with more ethylene to a top pressure of 925 atmospheres at 150° C. It was then held at 150° C./875–1000 atmospheres for 8 hours, with repressuring as necessary. During this time there was a total pressure drop of 730 atmospheres. The tube was cooled and opened, and the product was agitated with methanol in a blender, separated by filtration, and dried

TABLE I

| Example | Initiator | Medium | Temp. (° C.) | Time (hrs.) | Copolymer (g.) | Wt. percent propylene | Product M.P. | $\eta_{inh}$ |
|---|---|---|---|---|---|---|---|---|
| 2 | $Et_2BNEt_2$ (0.1 ml.) | Benzene (4 ml.) | 160 | 11 | 2.75 | 15.5 | 84 | 0.34 |
| 3 | $Et_2BN(NO)OEt$ (0.2 ml.) | do | 160 | 11 | 12.7 | 14 | 74 | 0.23 |
| 4 | $Et_2BON(Et)BEt_2$ (0.1 ml.) | do | 114 | 14 | 16.4 | 21 | 74 | 0.27 |
| 5 | $Et_2BON(H)Et$ (0.1 g.) | do | 150 | 12 | 18.9 | 19 | 68 | 0.20 |
| 6 | $(CH_3)_2BNEt_2$ (0.1 ml.) | do | 160 | 3 | 1.64 | 15 | 86 | 0.31 |

Examples 2 through 5 illustrate use of each of the initiators derived, separated and identified from the reaction product of triethylborane and nitric oxide. The compound of Example 6 may be produced by the reaction of a mixed trialkylborane such as $Et(CH_3)_2B$ with nitric oxide, but it is better prepared by the Grignard synthesis detailed in Example F.

EXAMPLE 7

Polymerization with $Et_2BON(Et)BEt_2$ and $Et_2BN(NO)OEt$ (A) A catalyst comprised of 75% $Et_2BON(Et)BEt_2$ and 25% $Et_2BN(NO)OEt$ was sealed in a 0.2 ml. glass ampoule in the absence of air. The ampoule was placed in a clean, dry 80 ml. shaker tube which was purged with dry nitrogen and evacuated five times. The shaker tube was charged with 33 g. of ethylene and was heated to 140° C. at which point 1000 atmospheres of pressure were in an oven under reduced pressure at 60–70° C. There was thus obtained 89 g. of solid polyethylene of M.P. 109° C. (differential thermal analysis), $\eta_{inh}=1.03$ (0.1% solution in tetrahydronaphthalene at 125° C.), and density 0.913.

When the 1,1-diphenyl-2-picrylhydrazyl coinitiator was omitted, only 9.5 g. of polymer was obtained. In two experiments in which different amounts of gaseous oxygen were used in place of 1,1-diphenyl-2-picrylhydrazyl, the yields of polymer were 14 g. and 23 g.

A number of other ethylene polymerizations were carried out by essentially the method of Example 8. Details of these examples are summarized in Table II. The initiators $(C_2H_5)_3B$, $B_2H_6$, $(n-C_4H_9)_3P \cdot BH_3$, $$[(CH_3)_2CHC(CH_3)_2BH_2]_2$$

and the coinitiators NO and $[(CH_3)_3C]_2NO$, were charged in sealed, frangible glass ampoules, which broke when the tube was first pressured with ethylene. In runs in which ampoules were used, in both these and subsequent examples, shaking was not started until after the ampoules had been thus broken. Each polymerization was run arbitrarily for about 8 hours at approximately 150° C. and 1000 atm., the amount of polymer formed in this time being taken as a measure of the rate of polymerization. The maximum amount of polymer that could be produced, set by the volume of the shaker tube, was about 110 g.

dried in an oven under reduced pressure at 60-70° C. There was obtained 35 g. of an ethylene/propylene copolymer containing 8 weight percent combined propylene (determined from the infrared absorption spectrum) and having $\eta_{inh}$=0.42 (0.1% solution intetrahydronaphthalene at 125° C.).

When the 1,1-diphenyl-2-picrylhydrazyl coinitiator was omitted in the above experiment, only a trace of an oily material was formed. No polymer at all was formed

TABLE II

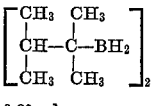

| Example | Amt. of initiator | Amt. of coinitiator | Grams polymer | M.P., °C. | $\eta_{inh}$ | Density | Remarks |
|---|---|---|---|---|---|---|---|
| 9 | 0.2 g. $(CH_3)_3N \cdot BH_3$ | 16 ml. $NO^2$ | 98 | 112 | 1.12 | 0.9143 | Increasing amount of NO to 120 ml. gave 80 g. polymer. |
| 10 | Same as above | 0.2 g $C_6H_5N(NO)ONH_4$ | 55 | 110 | 1.09 | 0.9314 | |
| 11 | do | 1.7 g. $[(CH_3)_3C]_2NO$ | 30 | 112 | 1.63 | 0.9153 | Used 50 ml. benzene as solvent. With no solvent, uncontrolled reaction occurred to give carbonized product. |
| 12 | 6 millimoles [3] $(C_2H_5)_3B$ | 12.2 ml. $NO^2$ | 70 | 113 | 0.85 | 0.9204 | Got 1.5-3.5 g. polymer with $(C_2H_5)_3B$ alone; 0.5-3.5 g. with $(C_2H_5)_3B$/gaseous oxygen. |
| 13 | 4 millimoles [3] $(C_2H_5)_3B$ | 0.2 g. DPPH[1] | 105 | 110 | | | |
| 14 | Same as above | 0.3 g. $(C_6H_5)_2NHO$ | 110 | 104 | 1.05 | 0.9249 | |
| 15 | do | 0.2 g. $C_6H_5NO$ | 45 | 109 | 1.01 | 0.9204 | |
| 16 | 1 millimole [4] $B_2H_6$ | 11 ml. $NO^2$ | 40 | 113 | 1.32 | 0.9166 | Got 0.5-1.4 g. polymer with $B_2H_6$ alone; 6.5-11.4 g. with $B_2H_6$/gaseous oxygen. |
| 17 | 2 millimoles [4] $B_2H_6$ | 0.2 g. $C_6H_5NO$ | 45 | 109 | 0.75 | 0.9226 | |
| 18 | Same as above | 0.2 g. DPPH[1] | 35 | 114 | 0.86 | 0.9116 | |
| 19 | 0.15 g. $(n-C_4H_9)_3B$ | 13 ml. $NO^2$ | 25 | | | | Got about 1 g. polymer with $(n-C_4H_9)_3B$ alone and with $(n-C_4H_9)_3B$/gaseous oxygen. |
| 20 | Same as above | 0.2 g. DPPH[1] | 20 | | | | |
| 21 | 0.2 g. $(C_6H_5)_3P \cdot BH_3$ | 12.8 ml. $NO^2$ | 85 | 109 | 1.76 | 0.9205 | Got 2.0 g. polymer with $(C_6H_5)_3P \cdot BH_3$ alone. |
| 22 | 0.16 g. $(n-C_4H_9)_3P \cdot BH_3$ | 14 ml. $NO^2$ | 68 | 112 | 1.21 | 0.9147 | Got 7.0 g. polymer with $(n-C_4H_9)_3P \cdot BH_3$ alone. |
| 23 | 0.25 ml. [structure] | 0.2 g. DPPH[1] | 42 | | | | |
| 24 | 0.20 ml. [structure] | 12.4 ml. $NO^2$ | 105 | 111 | 1.29 | 0.9180 | |
| 25 | 0.2 g. $(CH_3)_2NH \cdot BH_3$ | 12.4 ml. $NO^2$ | 70 | 109 | 1.09 | 0.9213 | |
| 26 | Same as above | 0.15 g. DPPH[1] | 55 | 107 | 1.06 | 0.9242 | |

[1] 1,1-diphenyl-2-picrylhydrazyl.    [2] As a gas.    [3] As 20% solution in iso-octane.    [4] As 1 millimole/ml. solution in tetrahydrofuran.

EXAMPLE 27

A shaker tube like that of Example 8 was charged with 0.2 g. of trimethylamine-borane and 0.2 g. of 1,1-diphenyl-2-picrylhydrazyl. It was cooled in a solid carbon dioxide/acetone mixture, evacuated, and charged with 51 g. of propylene. Shaking was started, and the tube was then pressured with ethylene to give a total pressure of 200 atm. at 25° C. The tube was heated to 150° C. over a period of one hour, during which time it was intermittently pressured with more ethylene to give a top pressure of 960 atm. at 150° C. The total amount of ethylene introduced into the tube was about 177 g. The tube and its contents were then heated at 148-151° C. for 7 hours and 45 minutes without repressuring. During this time there was a pressure drop of 230 atm. The tube was cooled and opened, and the solid product was agitated with methanol in a blender, separated by filtration, and when gaseous oxygen was substituted for 1,1-diphenyl-2-picrylhydraxyl.

By essentially the method of Example 27, a number of other ethylene copolymerizations were carried out. Details of these experiments are summarized in Table III. The initiator in each run, as in Example 27 was 0.2 g. of trimethylamine-borane. All coinitiators were charged in glass ampoules, nitric oxide being measured in as a gas. When other variables were held essentially constant, increasing the amount of comonomer usually, but not always, lowered the amount of copolymer produced. Combined propylene contents were determined from infrared absorption spectra. Other combined comonomer contents were calculated from elemental analyses.

TABLE III

| Example | Grams ethylene | Gms. comonomer | Amt. of coinitiator | Grams copolymer | Weight percent comonomer in product | $\eta_{inh}$ | Remarks |
|---|---|---|---|---|---|---|---|
| 28 | ca. 177 | 50 propylene | 1.7 g. $[(CH_3)_3C]NO$ | 22 | 16 | 0.35 | |
| 29 | ca. 177 | do | 13.5 ml. NO | 33 | 18 | 0.38 | |
| 30 | 179 | 30 methyl methacrylate | 13.0 ml. NO | 30 | 73 | 0.62 | |
| 31 | 144 | 100 vinyl acetate | 1.7 g. $[(CH_3)_3C]_2NO$ | 162 | 47.5 | 0.84 | With 50 g. vinyl acetate, $(CH_3)_3N \cdot BH_3$ alone gave 23 g. copolymer; $(CH_3)_3N \cdot BH_3$/gaseou, $O_2$ gave 60 g. copolymer. |
| 32 | 111 | 80 vinyl fluoride | 13.6 ml. NO | 60 | 27 | 1.05 | Used 50 ml. benzene as solvent. With 50 g. vinyl fluoride, and gaseous $O_2$ in place of NO, got 20 g. copolymer. |
| 33 | 137 | 50 vinylidene fluoride | 13.2 ml. NO | 65 | 8.5 | 1.12 | |
| 34 | 113 | 100 hexafluoropropylene | 13.3 ml. NO | 87 | 55 | 0.86 | |

EXAMPLE 35

An 80-ml. shaker tube lined with Hastelloy® C (a commercial alloy of nickel with, principally, molybdenum, chromium, iron and cobalt) was charged with 0.1 g. of trimethylamine-borane and 0.09 g. of tert-butyl nitrite, the latter in a sealed, frangible, glass ampoule. The tube was evacuated and pressured with ethylene to give a total pressure of 100 atm. at 25° C. The ampoule containing the coinitiator broke during this pressuring. Shaking was started, and the tube was heated to 99° C. over a period of 35 minutes. Ethylene and propylene were then injected in equimolar amounts such that the total pressure was 2450 atm. at 106° C. The internal temperature of the tube was raised at a rate of about 10° C. per hour until a significant pressure drop was recorded, indicating that copolymerization had started. This occurred, after 4 hours, at about 140° C. The tube was heated at 140–146° C. (mostly 145° C.) and 2060–2710 atm. for 11 hours, with intermittent repressuring by injection of equimolar amounts of propylene and ethylene. The mole ratio of the total amounts of propylene and ethylene added to the tube was about 4.5/1. The tube was cooled and opened, and the solid product was triturated with methanol and dried under reduced pressure (<1 mm.) at about 50° C. There was thus obtained 24.8 g. of ethylene/propylene copolymer that melted to a clear liquid on a heated metal block at 55° C. The infrared absorption spectrum indicated that the copolymer contained about 16% by weight of combined propylene. The inherent viscosity was 0.26 (0.25% solution in perchloroethylene at 60° C.).

When the tert-butyl nitrite coinitiator was omitted, the product was only 0.9 g. of an oil. When gaseous oxygen was substituted for the tert-butyl nitrite, the product was 2.9 g. of a sticky semi-solid.

By essentially the procedure of Example 35, a number of other ethylene/propylene copolymerizations were carried out. Details of these experiments are summarized in Table IV. In each run the temperature was determined by exploration as in Example 35 and was the lowest temperature at which a significant pressure drop was observed. Except as noted under "Remarks," the ethylene/propylene mole ratio was about 4.5/1, the initiator was 0.1 g. of trimethylamine-borane and the amount of combined comonomer in the product was estimated from the infrared absorption spectrum of the latter.

TABLE IV

| Example | Amt. of coinitiator | Medium | Temp., ° C. | Time, hrs. | Grams copolymer | Combined propylene in product, wt. percent | Product M.P., ° C. | Remarks |
|---|---|---|---|---|---|---|---|---|
| 36 | 0.6 g. (C₆H₅)₂NNO | 10 ml. toluene | 160 | 12 | 22 | 9 | 80 | Used 0.15 g. (CH₃)₃N.BH₃. |
| 37 | 0.3 g. 2,4,6-[(CH₃)₃C]₃C₆H₂O. | 22 ml. benzene | 145 | 10 | 10 | 9 | ca. 80 | |
| 38 | 0.1 g. (C₆H₅)₂NN(C₆H₅)₂ | 4 ml. benzene | 160 | 12 | 8.4 | 12 | 70 | |
| 39 | 0.2 g. NaNO₂ | None | 160 | 10 | 6.5 | 12 | 75 | |
| 40 | 0.09 g. NH₄NO₂ | {0.41 g. H₂O, 4 ml. benzene} | 122 | 9 | 8.7 | 13 | 70 | |

The results of additional experiments showing the effects of varying the ethylene/propylene mole ratio and/or the initiator/coinitiator mole ratio are summarized in Table V. The procedure was essentially that of Examples 35–40. The first experiment is that of Example 36.

TABLE V

| Ethylene/propylene, mole ratio | Initiator | Coinitiator | Initiator/coinitiator, mole ratio | Medium | Temp., ° C. | Time, hrs. | Copolymer Grams | M.P., ° C. | Combined propylene wt. percen |
|---|---|---|---|---|---|---|---|---|---|
| About 4.5/1 | (CH₃)₃N.BH₃ | (C₆H₅)₂NNO | 0.7/1 | Toluene | 160 | 12 | 22 | 80 | 9 |
| Do | Same as above | (C₆H₅)₂NNO | 11/1 | do | 115 | 14 | 23 | 85 | 9 |
| 3.0/1 | do | NO | 3.5/1 | None | 145 | 12 | 22.4 | 60 | 17 |
| 8.6/1 | do | (C₆H₅)₂NNO | 2.8/1 | Toluene | 140 | 17 | 40.4 | 85 | 7–8 |

EXAMPLE 41

A shaker tube like that of Example 35 was charged with 0.1 g. of trimethylamine-borane, 11 ml. of gaseous nitric oxide, and 5 g. of liquid isobutylene, the latter two materials in sealed, frangible, glass ampoules. The tube was evacuated and pressured with ethylene to 1000 atm. at ordinary temperature. The ampoules broke during this pressuring. Shaking was started, and over a period of about 50 minutes, the tube was heated and repressured with ethylene so that the total pressure was 2500 atm. at 132° C. At this point, copolymerization began, as indicated by a significant pressure drop. The total amount of ethylene introduced was about 42.4 g. The tube was heated at 132–136° C. (mostly 133° C.) without further repressuring for 15 hours, during which time the pressure fell to 530 atm. It was cooled and opened, and the solid product was worked up by the method of Example 35. There was obtained 23.2 g. of a solid ethylene/isobutylene copolymer melting at 95° C. to a clear liquid on a heated metal block. The infrared absorption spectrum showed strong absorption characteristic of gem-dimethyl groups, in accordance with the pressence of combined isobutylene units in the product.

Copolymerizations of ethylene with other comonomers were carried out by essentially the method of Example 41.

TABLE VI

| Example | Ethylene, g. | Comonomer | Amt. of coinitiator | Temp., ° C. | Time, hrs. | Pressure, atm. Top | Pressure, atm. Final | Copolymer Grams | M.P. | Combined comonomer, percent | Remarks |
|---|---|---|---|---|---|---|---|---|---|---|---|
| 42 | 39.4 | 4.5 g. tert-butylethylene. | 12 ml. (gas) NO | 126 | 14 | 2,000 | 1,120 | 9.3 | 140–190 | | Comonomer and NO charged in glass ampoules. Presence of combined tert-butylethylene shown by infrared absorption characteristic of gem-dimethyl groups. |
| 43 | 36.0 | 4.6 g. styrene | 0.1 g. (C₆H₅)₂NNO | 145 | 10.5 | 2,540 | 2,050 | 6.4 | 65 | 60 | Styrene content determined from ultraviolet absorption spectrum. |
| 44 | 40.3 | 9.8 g. dicyclopentadiene. | 0.1 g. (C₆H₅)₂NNO | 150 | 10.5 | 1,800 | 1,420 | 3.0 | 90–100 | | $\eta_{inh}$=0.25. Presence of combined dicyclopentadiene shown by infrared absorption characteristic of internal C=C. |

The details of these experiments are summarized in Table VI. The initiator in each run was 0.1 g. of trimethylamine-borane. The reaction temperature was determined by raising the internal temperature at about 10° C. per hour until a significant pressure drop was noted.

EXAMPLE 45

A shaker tube like that of Example 35 was charged with 0.1 g. of trimethylamine-borane, 0.1 g. of N-nitrosodiphenylamine, and 10 ml. of benzene. The tube was evacuated and then 36.8 g. of ethylene and 2.7 g. of propylene were injected. The tube was closed and, with shaking, the temperature was raised to 124° C. where reaction started. During the next 14 hours the pressure dropped from 1340 atm. to 350 atm. while the temperature was held at about 125° C. The tube was cooled and opened and the solid product was worked up by the method of Example 35. There was obtained 20.6 g. of a solid ethylene-propylene copolymer melting at 105° C. to a clear liquid on a heated metal block. The infrared absorption spectrum indicated a propylene content of 3% by weight in the product and a conversion of 52% of total monomers.

EXAMPLE 46

A shaker tube like that of Example 35 was charged with 0.1 g. of trimethylamine-borane, 0.1 g. of N-nitrosodiphenylamine and 15 ml. of a mixture of 1,2- and 1,3-perfluorodimethylcyclobutane. The tube was cooled to −10° C., evacuated, and warmed to room temperature at which time 26.37 g. of ethylene was injected. Shaking was started and the temperature was raised to 105° C. where 5.4 g. of propylene and 3.74 g. of ethylene were injected to raise the pressure to 2000 atm. The temperature was raised to 130° C. where copolymerization began. The tube was heated at 130° C. for 15 hours during which time an additional 7.5 g. of propylene and 3.47 g. of ethylene were added to maintain the pressure at 2000–2500 atm. The tube was cooled and opened and the solid product was worked up by the method of Example 35. There was obtained 20 g. of a solid ethylene-propylene copolymer melting at 60° C. to a clear liquid on a heated metal block. The infrared absorption spectrum indicated the presence of 17.5% propylene in the product.

EXAMPLE 47

A 400-ml., stainless-steel shaker tube was charged with 150 ml. of distilled water, 0.2 g. of disodium phosphate, 0.2 g. of trimethylamine-borane, 0.1 g. of N-nitrosodiphenylamine, and 0.1 g. of ammonium perfluorocaproate. The tube was cooled and evacuated, and then 30 g. of tetrafluoroethylene and 50 g. of ethylene were added. Shaking was started and the temperature was raised to 88° C. where the pressure was increased to 340 atm. by injection of additional water. The temperature was raised further to 145° C. during 7 hours and held at this temperature for 9 hours. The maximum pressure attained was 510 atm. and a significant pressure drop was observed during the polymerization. The tube was cooled and opened and the solid product was collected and triturated with water and methanol and dried under reduced pressure. There was thus obtained 5.3 g. of copolymer that melted to a clear liquid on a heated metal block at 260° C. The fluorine analysis corresponded to a copolymer containing 2.46 ethylene units for each tetrafluoroethylene unit.

Polymers and copolymers of ethylene prepared by both high-pressure and low-pressure (atmospheric) techniques have attained well-known commercial status and have a wide variety of uses depending upon the crystallinity, linearity, density, etc. Production of these polymers commercially runs to several million pounds annually. Thus, the usefulness of such polymers is well established.

The foregoing detailed description has been given for clearness of understanding only and no unnecessary limitations are to be understood therefrom. The invention is not limited to the exact details and description for obvious modifications will occur to those skilled in the art.

The embodiments of the invention in which an exclusive property or privilege is claimed are defined as follows:

1. The process which comprises polymerizing, at a pressure of at least about 200 atmospheres and a temperature of between about 100° and 250° C.,
(A) monomers selected from
  (i) ethylene or
  (ii) ethylene with up to two comonomers selected from lower terminal olefins; fluorinated olefins of 2 through 3 carbon atoms; vinyl lower alkanecarboxylates; lower alkyl methacrylates; styrene; styrene ring-substituted with substituents selected from lower alkyl, lower alkoxy, or halogen of atomic number 9–35; dicyclopentadiene; or di(methylcyclopentadiene); in mole ratios of not more than 0.5 mole of comonomer per mole of ethylene; in contact with
(B) an initiating system consisting essentially of
  (i) a borane initiator selected from $B_2H_6$, $RBH_2BH_2R$, $R_2BHBHR_2$, $R'_3B$, $R'_3N \cdot BH_3$, $R'_2NH \cdot BH_3$ or $R''_3P \cdot BH_3$ wherein R is alkyl of 1 through 9 carbon atoms; R' is alkyl of 1 through 12 carbon atoms and R'' is alkyl, aryl or alkaryl, each of up to 12 carbon atoms; and
  (ii) a coinitiator selected from
    (a) nitric oxide
    (b) a 1,1-diaryl-2-polynitrophenylhydrazyl of the formula

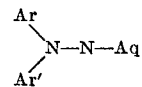

wherein Ar and Ar' each contain 6 through 12 carbon atoms and are each selected from aryl, lower alkylphenyl, lower alkoxyphenyl, or halophenyl in which the halogen is of atomic number 9–35; and Aq is a substituted phenyl group containing at least 2 and at most 3 nitro groups in the 2-, 4- and 6- positions and which can contain 1 substituent selected from —COOM, —$SO_3M$, halogen of atomic number 9–35, lower alkyl, or lower alkoxy, M being hydrogen or alkali metal;
    (c) an N-nitrosodiarylamine of the formula

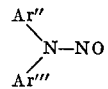

wherein Ar'' and Ar''' each contain 6 through 12 carbon atoms each and are selected from aryl, lower alkylaryl, di(lower alkyl)aryl, lower alkoxyaryl, di(lower alkoxy)aryl, haloaryl, dihaloaryl or alkylhaloaryl in which each halogen is of atomic number 9–35;

(d) a nitrosoarene of the formula

wherein U is selected from aryl of 6 through 12 carbon atoms, lower alkylphenyl, lower alkoxyphenyl, or halophenyl in which the halogen is of atomic number 9–35;

(e) a tetraarylhydrazine of the formula

U′₂N—NU″₂ wherein U′ and U″ are phenyl or naphthyl;
(f) a nitroxide of the formula

wherein Q is tertiary alkyl of 4 through 6 carbon atoms or 2,6-di(lower alkoxy)phenyl, and Q′ is Q, 2-phenyl-2-propyl, or, when Q is 2,6-di(lower alkoxy)phenyl, 4-(lower alkoxyphenyl);
(g) a tertiary alkyl nitrite of 4 through 8 carbon atoms;
(h) a nitrite salt wherein the cation is ammonium, an alkali metal, or an alkaline-earth metal;
(i) the ammonium salt of N-nitrosophenylhydroxylamine; or
(j) a poly(tert-alkyl)phenoxyl wherein the tert-alkyl group contains 4 through 6 carbon atoms; said borane compound being present in amounts of between 0.001% and 10% by weight of the total weight of monomers present; and said coinitiator being present in amounts of between 0.02 mole to 4 moles per mole of borane compound.

2. The process of claim 1 wherein the comonomers of part (A)(ii) include a monomer selected from diolefins, cyclodiolefins, carbon monoxide, or sulfur dioxide, in addition to one comonomer of part (A)(ii).

3. Process of claim 1 wherein the borane compound is R′₃N·BH₃.

4. Process of claim 3 wherein R′ is methyl.

5. The process of claim 1 wherein the borane compound is R″₃P·BH₃.

6. Process of claim 1 wherein the coinitiator is nitric oxide.

7. Process of claim 1 wherein the coinitiator is a 1,1-diaryl-2-(polynitrophenyl)hydrazyl.

8. Process of claim 1 wherein the coinitiator is an N-nitrosodiarylamine.

9. Process of claim 1 wherein the monomer is ethylene.

10. Process of claim 1 wherein the monomers are ethylene and a lower terminal olefin.

11. Process of claim 1 wherein the borane compound is selected from R′₃N·BH₃ or R″₃P·BH₃ and the coinitiator is selected from nitric oxide, a 1,1-diaryl-2-(polynitrophenyl)hydrazyl, or an N-nitrosodiarylamine.

12. Process of claim 11 carried out at a pressure of from about 500–3000 atmospheres and a temperature of about 100°–200° C.

13. Process of claim 12 wherein the said borane compound is present in amounts of betwen 0.02 and 2% by weight of the total weight of monomers present and said coinitiator is present in amounts of between 0.05 mole to 2 moles per mole of borane.

14. Process of claim 12 wherein the coinitiator is nitric oxide.

15. Process of claim 12 wherein the coinitiator is a 1,1-diaryl-2-(polynitrophenyl)hydrazyl.

16. Process of claim 15 wherein the coinitiator is a 1,1-diaryl-2-(2,4,6-trinitrophenyl)hydrazyl.

17. Process of claim 12 wherein the coinitiator is an N-nitrosodiarylamine.

18. Process of claim 12 wherein the borane compound is R′₃N·BH₃.

19. Process of claim 18 wherein R′ is methyl.

20. Process of claim 12 wherein the borane compound is R″₃P·BH₃.

21. Process of claim 16 wherein the coinitiator is 1,1-diphenyl-2-(2,4,6-trinitrophenyl)hydrazyl.

22. Process of claim 17 wherein the N-nitrosodiarylamine has the formula

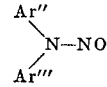

wherein Ar″ and Ar‴ are each aryl of 6 through 12 carbon atoms.

23. Process of claim 22 wherein Ar″ and Ar‴ are phenyl.

24. The process which comprises polymerizing monomers selected from
(i) ethylene or
(ii) ethylene with up to two comonomers selected from lower terminal olefins; fluorinated olefins of 2 through 3 carbon atoms; vinyl lower alkanecarboxylates; lower alkyl methacrylates; styrene; styrene ring-substituted with substituents selected from lower alkyl, lower alkoxy, or halogen of atomic number 9–35; dicyclopentadiene; or di(methylcyclopentadiene); in mole ratios of not more than 0.5 mole of comonomer per mole of ethylene;

by contacting the monomers at a pressure of at least about 200 atmospheres and a temperature of between about 100° and 250° C., with an initiating system comprising at least one compound from the group

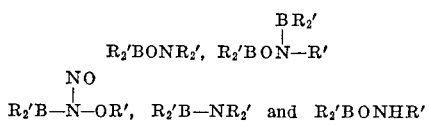

wherein
R′ is an alkyl group containing 1 through 12 carbon atoms.

25. The process of claim 24 wherein R′ is an alkyl group containing 1 through 6 carbon atoms.

References Cited
UNITED STATES PATENTS

| | | | |
|---|---|---|---|
| 3,200,101 | 8/1965 | Richard et al. | 260—88.2 |
| 3,236,823 | 2/1966 | Jennes et al. | 260—80.78 |
| 3,255,168 | 6/1966 | Borsini et al. | 260—94.9 |

JOSEPH L. SCHOFER, Primary Examiner

E. J. SMITH, Assistant Examiner

U.S. Cl. X.R.

260—79.3, 80.78, 80.81, 86.7, 87.3, 88.1, 94.9

UNITED STATES PATENT OFFICE
CERTIFICATE OF CORRECTION

Patent No. 3,594,357     Dated July 20, 1971

Inventor(s) Anestis L. Logethetis

It is certified that error appears in the above-identified patent and that said Letters Patent are hereby corrected as shown below:

Col. 10, line 46 - "$CH_2$" should read -- $CH_3$ --

Table III, Example 31 - under "Remarks", "gaseou," should read -- gaseous --

Col. 19, Claim 1, formula between lines 5 and 10 - "H" should read -- O --.

Signed and sealed this 18th day of January 1972.

(SEAL)
Attest:

EDWARD M. FLETCHER, JR.     ROBERT GOTTSCHALK
Attesting Officer     Acting Commissioner of Patents